Patented June 25, 1935

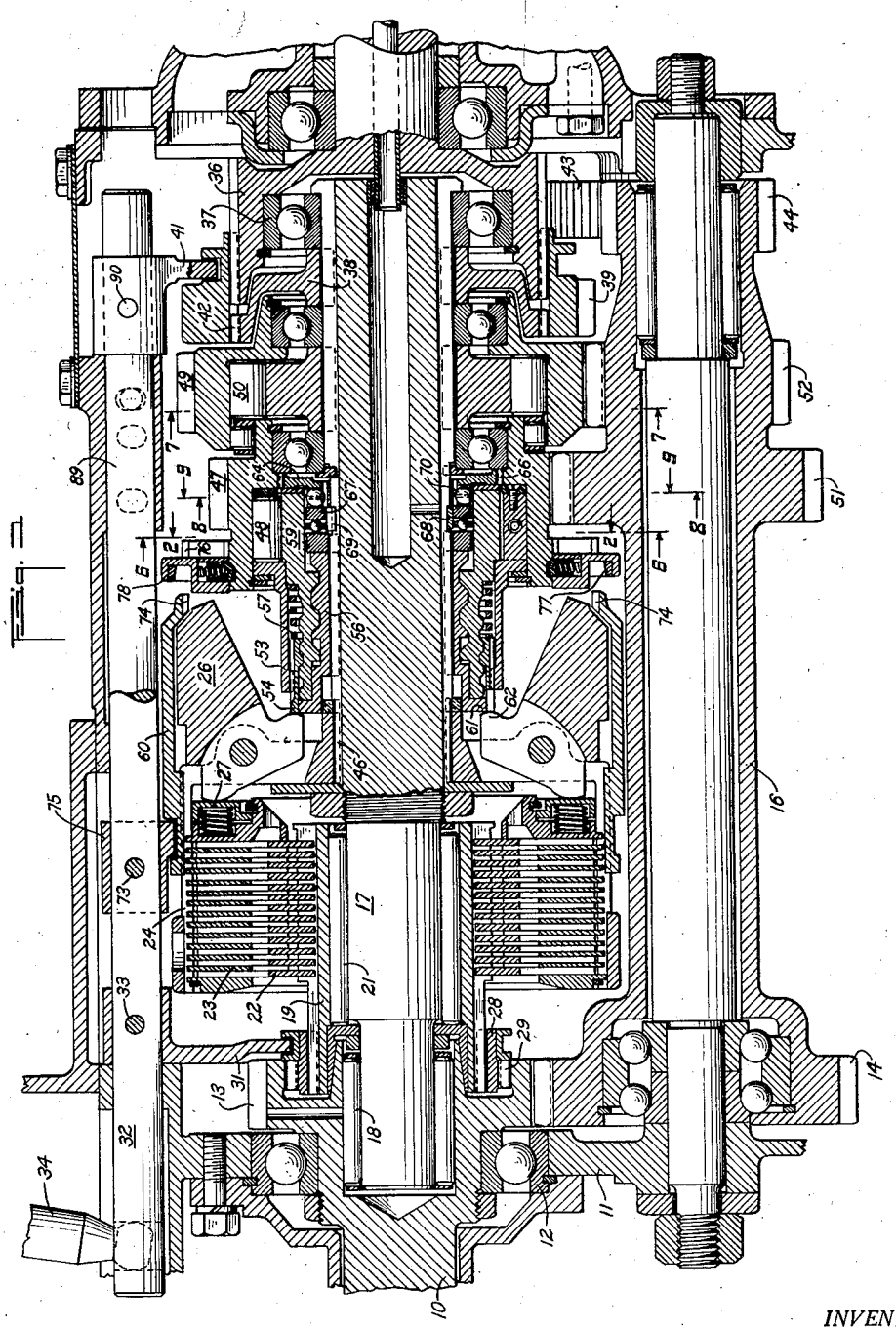

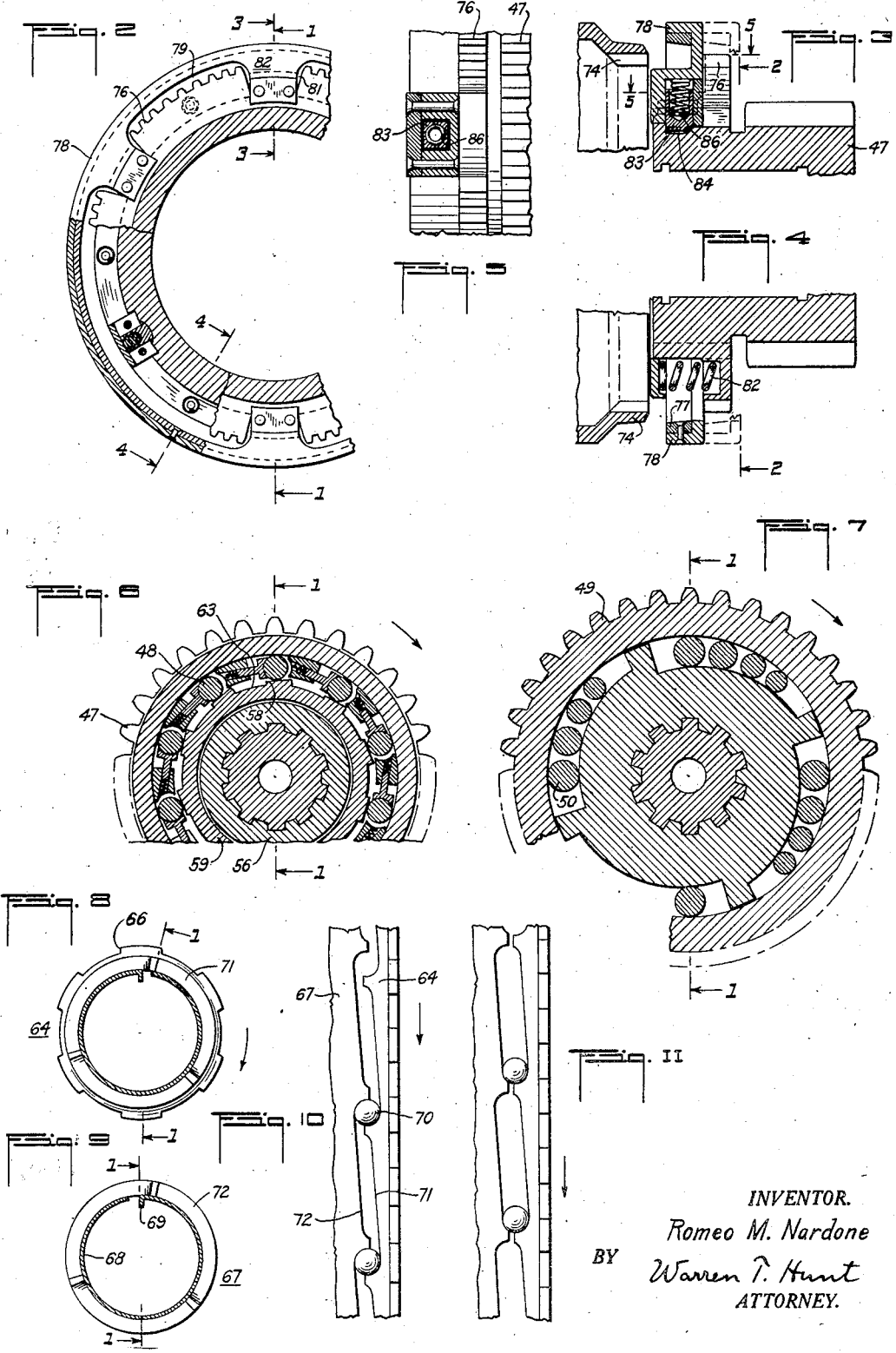

2,005,843

UNITED STATES PATENT OFFICE 2,005,843

TRANSMISSION

Romeo M. Nardone, East Orange, N. J., assignor, by mesne assignments, to Eclipse Aviation Corporation, East Orange, N. J., a corporation of New Jersey Application April 17, 1933, Serial No. 666,577

13 Claims. (Cl. 74—336)

This invention relates to transmission mechanisms and more particularly to an automatic variable speed transmission mechanism such as is ordinarily used on automotive vehicles.

An object of the invention is to provide a variable speed transmission mechanism having a plurality of gear ratios in which the ratios may be changed automatically or positively at the will of the operator.

Another object of the invention is to provide an automatic variable speed transmission in which a positive drive may be engaged at any time, whereby the engine may be used as a brake.

Another object of the invention is to provide an automatic variable speed transmission having a centrifugally controlled clutch for the high speed mechanism in which a low speed gear ratio may be engaged without having to counteract the centrifugal force of the clutch engaging weights.

Another object of the invention is to provide an automatic transmission having a gear train including an overrunning clutch with a device for directly connecting the gear train with the driven shaft around the overrunning clutch, whereby free-wheeling is prevented.

Another object of the invention is to provide a novel synchronizing device for facilitating the engagement of a positive drive in a transmission of the automatic type.

Other objects and features of the invention will be apparent from the following description in connection with which a preferred embodiment of the invention has been illustrated in the accompanying drawings, in which:

Fig. 1 is a sectional elevational view illustrating the transmission in the high speed position;

Fig. 2 is a sectional view of the synchronizing device taken along the line 2—2 of Fig. 1;

Fig. 3 is an enlarged sectional view taken on the line 3—3 of Fig. 2;

Fig. 4 is an enlarged sectional view taken along the line 4—4 of Fig. 2;

Fig. 5 is a view taken along the line 5—5 of Fig. 3;

Fig. 6 is a sectional view of the second speed gear overrunning clutch taken along the line 6—6 of Fig. 1;

Fig. 7 is a sectional view of the low speed overrunning clutch taken along the line 7—7 of Fig. 1;

Fig. 8 is a view of one of the cam members for collapsing the weights when the load is taken by the low speed mechanism, the view being taken in the direction of the arrows 8—8 shown in view Fig. 1;

Fig. 9 is a view of the complementary cam member taken in the direction of the arrows 9—9 of Fig. 1;

Fig. 10 is a development of the annular cam members, shown in Figs. 8 and 9, illustrating their relationship in the high and second speed positions; and Fig. 11 is a view similar to Fig. 10 showing the position of the cam members when the transmission is in the low gear ratio.

The present application illustrates a transmission of the same general type as that illustrated in my co-pending application, Serial No. 646,330, filed December 8, 1932, and differs therefrom principally by the addition of an improved mechanism for positively engaging the second speed gear, in order to permit the engine to act as a brake in descending a hill.

In transmissions of the automatic type, such as that illustrated, the speed ratios are selected in accordance with the torque reaction on the driven shaft and it is apparent that in descending a hill, the load on the engine reverses and the engine is connected to the rear axle through the high speed driving mechanism because of the reversal of torque. In certain cases this is objectionable, as the high speed driving ratio does not permit the engine to exert sufficient braking force and it is desirable to positively engage one of the lower speeds, whereby the mechanical advantage of the engine as a braking factor may be increased.

In an automatic transmission of the type illustrated, the overrunning clutch of the second speed gear is ordinarily so constructed as to assume two operating positions, in one of which the clutch overruns in one direction and the other position it overruns in the opposite direction. The overrunning clutch is also so constructed that when the load thereon is released and the clutch centrifugal weights are depressed, the second speed overrunning clutch is in a position to transmit a driving force from the rear wheels to the engine. Therefore, the second speed positive gear ratio may be engaged by a depression of the centrifugal weights. This method of engaging the second speed device was used in my co-pending application, Serial No. 646,330, but is open to certain objections in that at high driving shaft speeds, it requires considerable manual effort to depress the weights and the present application, although having the same automatic characteristics as the transmission of my co-pending application, Serial No. 646,330, is an improvement thereon by the incorporation of a device for positively engaging the second speed gear ratio without the necessity of depressing the weights.

Briefly, the engagement of the second speed gear ratio in the present application is accomplished by disengaging the high speed clutch from the driving shaft and immediately thereafter directly connecting the second speed gear to the driven shaft by a slidable ring member which bridges the space between the high speed clutch driven member and the second speed gear. A countershaft is provided in the transmission which is at all times driven by the driving shaft, and after the connection is broken between the high speed clutch and the driving shaft, the drive is transmitted around both the high speed clutch and the overrunning clutch by means of a gear train including the counter shaft.

Although the automatic features of the transmission are to all intents and purposes the same as those shown in my co-pending application, Serial No. 646,330, the structural relation of the transmission will be briefly described, but it is understood that the present invention is applicable to other types of transmissions as well as the one herein illustrated.

Referring to the drawings, 10 is the driving shaft mounted in the housing 11 by a bearing 12 and provided with a gear 13 meshing with a gear 14 on the countershaft 16. A driven shaft 17 is piloted within driving shaft 10 by bearing 18 and carries high speed clutch driving member 19, which is rotatably mounted thereon by bearing 21. Clutch member 19 is provided with a series of driving discs 22, between which are driven discs 23 having a splined connection to the outer or driven clutch drum 24. Both sets of discs are slidable upon their respective members and adapted to be pressed into driving engagement by centrifugal weights 26 which press against the plates through the medium of collar 27. A slidable clutch member 28 is splined upon clutch drum 19, which is provided with teeth 29 adapted to engage similar teeth formed on the interior of gear 13. Clutch member 28 is slidable with respect to clutch drum 19 by means of yoke 31, which is secured to shifting rod 32 by pin 33, the rod being adapted to be reciprocated by the manually movable lever 34. It may be seen that when clutch member 28 is in mesh with gear 13 the drum 19 is directly driven by the drive shaft 10, but may be disengaged therefrom by moving clutch member 28 toward the right, as viewed in Fig. 1. The right end of shaft 17 is mounted within the annular end portion of propeller shaft 36 by a bearing 37 and is provided with a toothed member 38 adapted to be engaged by a gear 39 which is shiftable by manually operated yoke 41 to three positions, one of which corresponds to forward drive, another to a neutral position, and the third to the reverse gear position. In Fig. 1 the gear 39 is shown as in the position corresponding to forward drive, but it may be observed that movement of the gear towards the right will result in demeshing of teeth 42 and disconnecting the driven shaft 17 from the propeller shaft 36 and that further movement toward the right will engage gear 39 with idler gear 43 which is in constant mesh with countershaft gear 44, and cause the propeller shaft 36 to be driven in the reverse direction by a forward movement of the driving shaft 10.

*High speed drive*

In the high speed forward drive, wherein the parts are in the position shown in Fig. 1, the drive is taken directly from driving shaft 10 to clutch drum 19 and through the friction plates 22 and 23 to the outer drum 24, which has a splined connection with the driven shaft 17 at 46, the drive being transmitted to the propeller shaft 36 by toothed member 38 and gear 39 which has a splined connection with propeller shaft 36. The second speed gear 47 is provided with an overrunning clutch 48 and the low speed gear 49 is provided with an overrunning clutch 50, whereby in the high speed position both the second and low speed gears may be overrun by the shaft 17, it being understood that gears 47 and 49 are in mesh with countershaft gears 51 and 52.

*Second speed gear operation*

The second speed gear overrunning clutch, generally designated by the numeral 48, is adapted to assume either of two positions. This is accomplished by cage 53, which is adapted to rotate the entire roller assembly in either direction depending upon position of sleeve 54 which has a splined connection with sleeve 53 and a threaded connection with the hub 59 of the second speed gear. Sleeve 54 is normally pressed toward the left, as viewed in Fig. 1, by spring 57 which spring is adapted to be counteracted by outward movement of weights 26, the spring being so chosen that in the high speed position sleeve 54 is pressed toward the right and rotates cage 53 to the position illustrated in Fig. 6 wherein rollers 48 are in contact with cam 58 and second speed gear 47 is adapted to assume the load when the speed has been reduced to a point whereat the high speed clutch starts to slip, at which point nut 56 will be moved toward the left, as viewed in Fig. 1, by its threaded relation with hub 59 and will cause shoulder 61 to engage the noses 62 of weights 26 and depress them to their inner position, whereby the high speed clutch is completely disengaged.

*Low speed drive*

If the load on the propeller shaft should be increased to a point where it is necessary to engage the low speed gear ratio, the load on the second speed gear roller clutch may be temporarily released by controlling the vehicle engine, whereupon sleeve 54 will be pressed toward the left, as viewed in Fig. 1, by spring 57 and will rotate cage 53 in a counterclockwise direction, as viewed in Fig. 6, to a position wherein rollers 48 will be opposite to depressions 63 in the second speed gear hub 59 and the load may be assumed by the low speed gear 49. The driven shaft 17 will then be rotated more slowly than the second speed gear 47 and it will be noted that cam member 64 is connected to gear 47 by teeth 66 while the corresponding cam member 67 is in frictional engagement with the driven shaft 17 by an expansible spring ring 68 which has one end secured to the driven shaft 17 by a depending flange 69 in engagement with the shaft splines. Ring 68 is so constructed that it has its free end in contact with cam member 67 and is so wound that when second speed gear 47 is driven faster than the shaft 17 and cam 67 is pulled around with cam 64, the relative rotation of cam 67 with respect to shaft 17 will expand the ring and impart a drag upon cam member 67 which will therefore have a tendency to lag behind the positively driven cam member 64. Rollers or balls 70 are interposed between the cam faces 71 and 72, respectively, and as cam 64 advances with respect to cam 67 from the position shown in Fig. 10 to that shown in Fig. 11, nut 56 will be moved toward the left, as viewed in Fig. 1, to depress the weights in the same manner as they were depressed by the load reaction on the second speed gear.

The automatic operation of the transmission, as above described, is similar to the one disclosed in my co-pending application, Serial No. 646,330, and it will be noted that as both second speed gear 47 and low speed gear 49 each include overrunning clutches which permit driven shaft 17 to overrun the gears in the forward direction, it will be impossible to descend a grade with the transmission in either of the lower speed gear ratios. In order to obviate this condition, means have been provided in the present application for disconnecting the high speed clutch from the driving shaft and to directly connect it with the outer portion of the second speed gear. To this end an annular sleeve 60 is slidably splined to clutch drum 24, the sleeve being movable by yoke 75 which is secured to rod 32 by pin 73, the relationship of yoke 75 to yoke 31 being such that clutch member 29 is disengaged from gear 13 prior to engagement of member 60 with the second speed gear 47. The outer end of member 60 is supplied with teeth 74 which are adapted to engage with toothed member 76 that is secured to the second speed gear 47. In order to facilitate engagement of teeth 74 with toothed member 76, it is preferred to synchronize the speed of sleeve 60 with that of the second speed gear, and therefore the outer surface of the end portion of member 60 is preferably tapered, as shown at 74, which portion is adapted to engage a friction member 77 secured to slidable collar 78. Slidable collar 78 is splined to gear 47 and adapted to slide axially thereof over toothed member 76 by reason of cut-out portions 79, as viewed in Fig. 2, it being understood that member 76 has similar cut-out portions 81 within which the depending flanges 80 are slidably movable. The collar 78 is normally urged toward the high speed clutch by springs 82 and is resiliently held in that position by plungers 83 which normally rest in notches 84 but which may be dislodged therefrom by an axial pressure upon the collar 78 sufficient to compress the springs 86 and move collar 78 to the position shown in dotted lines in Figs. 3 and 4.

From the above description, it will be noted that movement of rod 32 toward the right will first disengage the clutch driving member 19 from the driving shaft 10 and that further movement toward the right will cause sleeve 60 to frictionally engage collar 78 to synchronize the speeds of the sleeve and second speed gear, and that still further movement of sleeve 60 toward the right, as viewed in Fig. 1, will directly connect the high speed clutch drum 24 with second speed gear 47. After direct engagement of sleeve 60 and gear 76 has been accomplished, driving shaft 10 is positively connected to the propeller shaft 36 by gears 13, 14, 51 and 47, and from gear 47 to the sleeve 60, which is splined to the clutch drum 24 that in turn has a splined connection with the driven shaft 17 at 46. It will be observed that the mechanism herein disclosed may be easily operated to directly connect the driven shaft to the driving shaft around both the high speed clutch and the second speed overrunning clutch, whereby it is possible to cause the engine to act as a brake with the transmission in the second speed gear ratio. Sleeve 60 is preferably formed with an interior diameter sufficiently large to clear weights 26 when they are in the outermost position, and therefore it is not necessary to exert inward pressure upon the weights when engaging the positive second speed gear.

The operator is able to disconnect the driven shaft 17 from either the driving shaft 10 or propeller shaft 46 by selective movements of the rod 32 and the rod 89 to which the shifter fork 41 is secured by pin 90.

While a preferred embodiment of the invention has been illustrated and described, it is understood that this showing and description are illustrative only and that the invention is not regarded as limited to the form shown and described, or otherwise, except by the terms of the following claims:

What is claimed is:

1. In an automatic variable speed transmission, a driving shaft, a driven shaft, a direct drive clutch having a drum element connected to one of said shafts, and a hub element connected to the other of said shafts, frictional means connecting the hub and drum elements, a gear train including a gear having an overrunning clutch for connecting the shafts around the direct drive clutch, a manually shiftable member rotatable with the driven element for coupling the gear to the driven element around the overrunning clutch and disconnecting the direct drive clutch from the driving shaft by a unidirectional manual operation.

2. In an automatic variable speed transmission, a driving shaft, a driven shaft, a direct drive clutch having a hub element connected to the driving shaft and a drum element connected to the driven shaft, frictional means connecting the hub and drum elements, a gear train including a gear on the driven shaft having an overrunning clutch for connecting the shafts around the clutch, a manually shiftable member concentric with the shafts for directly connecting the clutch drum to the gear having the overrunning clutch, and means for disconnecting the clutch hub from the driving shaft.

3. In an automatic variable speed transmission, a driving shaft, a driven shaft, a direct drive clutch having a hub connected to the driving shaft and a drum connected to the driven shaft, a gear train including a gear on the driven shaft having an overrunning clutch for connecting the shafts around the clutch, a manually shiftable member for directly connecting the clutch drum to the gear having the overrunning clutch, means for disconnecting the clutch hub from the driving shaft, and said member having a splined connection with the drum and axially movable toward the gear to engage the same.

4. In an automatic variable speed transmission, a driving shaft, a driven shaft, a direct drive clutch having a hub connected to the driving shaft and a drum connected to the driven shaft, a gear train including a gear on the driven shaft having an overrunning clutch for connecting the shafts around the direct drive clutch, a manually shiftable sleeve member for directly connecting the clutch drum to the gear having the overrunning clutch, means for disconnecting the clutch hub from the driving shaft, centrifugal weights for controlling the direct drive clutch arranged on the drum between the drum and the gear, and said manually shiftable member being arranged to bridge the space between the drum and gear, and to clear said weights in all operative positions thereof.

5. In an automatic variable speed transmission, a driving shaft, a driven shaft, a direct drive clutch having a drum secured to the driven shaft and a hub secured to the driving shaft, a gear train for connecting the shafts around the direct drive clutch, said gear train including a gear on the driven shaft, said gear having a toothed rim and a hub connected to the driven shaft through a threaded member splined to the driven shaft, means forming an overrunning clutch between the rim and hub, manually shiftable means for connecting the drum to the gear rim, and means for disconnecting the direct drive clutch hub from the driving shaft.

6. In an automatic variable speed transmission, a driving shaft, a driven shaft, a direct drive clutch having a drum secured to the driven shaft and a hub secured to the driving shaft, a gear train for connecting the shafts around the direct drive clutch, said gear train including a gear on the driven shaft, said gear having a toothed rim and a hub connected to the driven shaft through a threaded member splined to the driven shaft, means forming an overrunning clutch between the rim and hub, a manually shiftable ring splined to said drum having a friction surface and a toothed portion, a movable friction member rotatable with said gear, said gear having a toothed portion for coacting with the toothed portion of said ring, said ring being slidable into contact with said friction members and adapted to positively engage said gear upon further movement thereof.

7. In an automatic variable speed transmission, a driving shaft, a driven shaft, a direct drive clutch having a drum secured to the driven shaft and a hub secured to the driving shaft, a gear train for connecting the shafts around the direct drive clutch, said gear train including a gear on the driven shaft, said gear having a toothed rim and a hub connected to the driven shaft through a threaded member splined to the driven shaft, means forming an overrunning clutch between the rim and hub, means for disconnecting said direct drive hub from the driving shaft, and means for positively connecting said rim to said drum.

8. In an automatic variable speed transmission, a driving shaft, a driven shaft, a direct drive clutch having a drum secured to the driven shaft and a hub secured to the driving shaft, a gear train for connecting the shafts around the direct drive clutch, said gear train including a gear on the driven shaft, said gear having a toothed rim and a hub connected to the driven shaft through a threaded member splined to the driven shaft, means forming an overrunning clutch between the rim and hub, and manually movable means shiftable as a unit for disconnecting said direct drive hub from the driving shaft and connecting said rim to said drum.

9. In an automatic variable speed transmission, a driving shaft, a driven shaft, a countershaft, means including a coupling member for connecting the driving shaft to the driven shaft in a high speed ratio, means including the countershaft and a gear having its hub connected to the driven shaft through an overrunning clutch for connecting the driving shaft to the driven shaft in a lower speed ratio, manually operable means for positively connecting the gear to the driven shaft around the clutch, and means associated with the manually operable means for moving the coupling member to disconnect the driving shaft from the driven shaft prior to the positive connection of the gear with the driven shaft.

10. In an automatic variable speed transmission, a driving shaft, a driven shaft, a countershaft, means including a coupling member for connecting the driving shaft to the driven shaft in a high speed ratio, means including the countershaft and a gear having its hub connected to the driven shaft through an overrunning clutch for connecting the driving shaft to the driven shaft in a lower speed ratio, manually operable means for positively connecting the gear to the driven shaft around the clutch, means associated with the manually operable means for moving the coupling member to disconnect the driving shaft from the driven shaft prior to the direct connection of the gear with the driven shaft, and means for frictionally connecting the gear to the driven shaft prior to the positive connection thereof.

11. In an automatic variable speed transmission, a driving shaft, a driven shaft, a direct drive clutch for connecting the shafts, means including a gear connected to the driven shaft for connecting the shafts around the direct drive clutch, centrifugal weights for controlling the direct drive clutch located between the gear and the direct drive clutch, a manually movable member encircling the weights for directly connecting the gear to the driven shaft through a portion of the direct drive clutch, and means associated with the member for positively disconnecting the driving shaft from the clutch.

12. In an automatic variable speed transmission, a driving shaft, a driven shaft, a direct drive clutch for connecting the shafts, means including a gear connected to the driven shaft for connecting the shafts around the direct drive clutch, centrifugal weights for controlling the direct drive clutch located between the gear and the direct drive clutch, a manually movable member encircling the weights for directly connecting the gear to the driven shaft through a portion of the direct drive clutch, and means associated with the member for positively disconnecting the driving shaft from the clutch, said last named means being arranged to disconnect the driving shaft from the clutch prior to the direct connection of the gear with the driven shaft.

13. In an automatic variable speed transmission, a driving shaft, a driven shaft, a clutch for connecting the shafts in a high speed ratio, a gear train connecting the shafts around the clutch in a lower speed ratio including a gear connected to the driven shaft through an overrunning device, torque responsive means for controlling the clutch and the lower speed connecting means arranged to select a higher speed ratio upon a decrease in driven shaft load and to select a lower speed ratio upon an increase in driven shaft load, said clutch having a portion operatively connected with the driving shaft and a portion operatively connected with the driven shaft, manually operable means for disconnecting the driving portion of the clutch from the driving shaft, and a connector movable with the manually operable means and arranged to drivably connect the lower speed gear means with the driven portion of the clutch subsequent to the disconnection of the driving portion of the clutch from the driving shaft, whereby the shafts are positively connected through the lower speed ratio around the overrunning device, and the torque responsive means is inoperative to change the gear ratio.

ROMEO M. NARDONE.